United States Patent [19]

Stipp et al.

[11] Patent Number: 5,387,705
[45] Date of Patent: Feb. 7, 1995

[54] FATTY ACID ANHYDRIDE PROCESS

[75] Inventors: Gordon K. Stipp, Cincinnati; Bernard W. Kluesener, Harrison, both of Ohio

[73] Assignee: The Procter & Gamble Company, Cincinnati, Ohio

[21] Appl. No.: 106,474

[22] Filed: Aug. 13, 1993

[51] Int. Cl.⁶ .............................................. C11C 3/08
[52] U.S. Cl. .................................. 554/164; 554/172; 562/895
[58] Field of Search ................. 562/895; 554/164, 172

[56] References Cited

U.S. PATENT DOCUMENTS

| | | | |
|---|---|---|---|
| 1,959,590 | 5/1934 | Lorand | 260/233.5 |
| 2,026,985 | 1/1936 | Malm et al. | 562/895 |
| 2,163,013 | 6/1939 | Schulz | 260/546 |
| 2,221,026 | 11/1940 | Malm et al. | 260/546 |
| 2,246,599 | 6/1941 | Oxley et al. | 562/895 |
| 2,254,652 | 9/1941 | Hiatt et al. | 260/225 |
| 2,411,567 | 11/1946 | Fisher | 260/398 |
| 2,426,859 | 7/1949 | Hagemeyer et al. | 562/895 |
| 2,476,859 | 7/1949 | Hagemeyer, Jr. | 260/342.6 |
| 2,520,139 | 8/1950 | Fuchs | 260/346.8 |
| 2,730,530 | 1/1956 | Ohlson et al. | 562/895 |
| 2,923,718 | 2/1960 | Donatus et al. | 562/895 |
| 2,923,719 | 2/1960 | Donatus et al. | 562/895 |
| 2,981,744 | 4/1961 | Ward | 260/419 |
| 3,927,051 | 12/1975 | de Klein | 260/413 |
| 4,002,677 | 1/1977 | Naglieri et al. | 260/549 |
| 4,002,678 | 1/1977 | Naglieri et al. | 260/549 |
| 4,067,900 | 1/1978 | Intille | 560/138 |
| 4,115,444 | 9/1978 | Rizkalla | 260/549 |
| 4,251,458 | 2/1981 | Pugach | 260/546 |
| 4,335,058 | 6/1982 | Rizkalla | 260/546 |
| 4,335,059 | 6/1982 | Rizkalla | 260/549 |
| 4,477,382 | 10/1984 | Goel et al. | 260/398 |
| 4,483,803 | 11/1984 | Rizkalla | 260/546 |
| 4,483,804 | 11/1984 | Rizkalla | 260/546 |
| 4,521,630 | 6/1985 | Wattimena et al. | 568/435 |
| 4,559,183 | 12/1985 | Hewlett | 260/546 |
| 4,698,187 | 10/1987 | Hewlett | 260/546 |
| 4,749,814 | 6/1988 | Chabardes | 568/384 |
| 4,827,044 | 5/1989 | Tozzolino et al. | 568/319 |
| 4,830,789 | 5/1989 | Hinenoya et al. | 562/895 |
| 4,855,457 | 8/1989 | Ramzi et al. | 549/239 |
| 4,874,558 | 10/1989 | Fife et al. | 562/894 |
| 4,888,196 | 12/1989 | Ehrman et al. | 426/601 |
| 5,023,106 | 6/1991 | Ehrman et al. | 426/660 |
| 5,066,510 | 11/1991 | Ehrman et al. | 426/607 |
| 5,142,071 | 8/1992 | Kluesener et al. | 554/172 |
| 5,142,072 | 8/1992 | Stipp et al. | 554/172 |
| 5,188,858 | 2/1993 | Stipp et al. | 426/531 |

FOREIGN PATENT DOCUMENTS

| | | | |
|---|---|---|---|
| 0497668 | 11/1953 | Canada | 562/895 |
| 0542479 | 6/1957 | Canada | 562/895 |
| 695179 | 9/1964 | Canada | 260/596 |
| 447756 | 5/1936 | United Kingdom | 562/895 |
| 507592 | 6/1939 | United Kingdom | 562/895 |
| 0516518 | 1/1940 | United Kingdom | 562/895 |
| 656740 | 8/1951 | United Kingdom | 562/895 |
| 0812963 | 5/1959 | United Kingdom | 562/895 |

OTHER PUBLICATIONS

Fennema, "Lipids", *Food Chemistry* 2nd Ed; pp. 205–209; (1985).

(List continued on next page.)

*Primary Examiner*—Raymond J. Henley, III
*Assistant Examiner*—Keith MacMillan
*Attorney, Agent, or Firm*—Tara M. Rosnell

[57] ABSTRACT

A fast, three-stage, low temperature process for the conversion of fatty acids into food grade-anhydrides is disclosed. The process comprises as a first step the reaction of a higher fatty acid with a dehydrating agent under mild conditions. A second process step comprises the further conversion of mixed anhydrides to symmetrical anhydrides by continuous removal of the dehydrating agent and by-product acid from the reaction mixture under vacuum. In a third process step, the symmetrical anhydrides are purified under mild conditions, preferably using thin-film short path evaporation. The resulting anhydrides have minimal by-products and good color and odor.

20 Claims, No Drawings

OTHER PUBLICATIONS

Hassner, Alfred and Vazken Alexanian, "Direct Room Temperature Esterification of Carboxylic Acids", *Tetrahedron Letters* No. 46, pp. 4475–4478; Pergamon Press Ltd. (1978).

Kim, Sunggak, Lee, Jae In and Ko, Young Kwan, "Di--2-Pyridyl Carbonate: A New Efficient Coupling Agent for the Esterification of Carboxylic Acids", *Tetrahedron Letters,* vol. 25, No. 43, pp. 4943–4946; Pergamon Press Ltd. (1984).

Orshansky, Jehuda and Bograchov, Eliahu, "Laboratory Method for the Preparation of Organic Acid Anhydrides", *Chemistry and Industry* p. 382, 1984.

Ralston, A. W., "The Fatty Acid Anhydrides, Acid Chlorides, Aldehydes, Ketones, and Related Compounds", *Fatty Acids and Their Derivatives,* pp. 794–866, John Wiley & Sons, Inc. Chapman & Hall, Ltd., (1948).

Shambhu, Manvendra and Digenis, George, "Insoluble Resins in Organic Syntheses I. Preparation and Reactions of Polymeric Anhydridest", *Tetrahedron Letters,* No. 18, pp. 1627–1629; Pergamon Press Ltd. (1973).

Shambhu, Manvendra B. and Digenis, George A. "Insoluble Resins with Mixed Carbonic-carboxylix Anhydride Functions. Preparations and Applications as Mild Selective Acylating Regents", *J. C. S. Chem. Comm.* pp. 619–620, (1974).

Smalley, R. K. and Suschitzky, H., "A Simple Preparation of Acid Anhydrides", *Smalley and Suschitzky,* pp. 755–757, (1964).

Sonntag, Norman O. V., "Dehydration, Pyrolysis, and Polymerization", *Fatty Acids; Their Chemistry, Properties, Production and Uses,* pp. 3561–3588, Robert E. Krieger Pub. Co. (1983).

Sonntag, N. O. V., Trowbridge, J. R. and Krems, I. J., "Reactions of Fatty Acid Chlorides. Preparation of Fatty Acid Anhydrides" *The Journal of the American Oil Chemists' Society,* vol. 31; pp. 151–157, (1954).

FATTY ACID ANHYDRIDE PROCESS

TECHNICAL FIELD

The present invention relates to a non-catalytic process for the conversion of fatty acids into food-grade fatty acid anhydrides. The resultant anhydrides have minimal color and odor formation, purity levels of at least 95%, and contain no appreciable by-products such as di-fatty ketones or mixed anhydrides.

BACKGROUND OF THE INVENTION

Chocolate is an extremely popular and versatile food product which is characterized by a smooth, creamy consistency upon mastication. The desirable eating properties of chocolate are derived largely from the melting properties of cocoa butter which is typically present in chocolate at 25–35% by weight. The melting behavior of cocoa butter is the result of its unique triglyceride composition. However, this unique triglyceride composition, like the triglyceride composition of other natural fats, is relatively high in calories. Approximately 50% of the calories in chocolate products come from fat which is exclusively or predominantly cocoa butter. This means that persons who must restrict their intake of calories must either reduce the amount of chocolate products they consume, or in the extreme case, completely exclude such products from their diet.

Low calorie cocoa butter substitutes which have physical properties similar to cocoa butter have been developed. See, for example, U.S. Pat. Nos. 4,888,196; 5,023,106; and 5,066,510, Issued Dec. 19, 1989; Jun. 11, 1991 and Nov. 19, 1991, respectively, to Ehrman, Seiden, Weitzel and White (Ehrman et al). Such reduced calorie cocoa butter substitutes can conveniently be prepared, for example, by the acylation of monobehenin with caprylic and capric fatty acids or anhydrides. See U.S. Pat. No. 5,142,071 to Bernard W. Kluesener, Gordon Stipp and David Yang, Issued Aug. 25, 1992; and U.S. Pat. No. 5,142,072 to Gordon K. Stipp and Bernard W. Kluesener, Issued Aug. 25, 1992, especially Example 7, both of which are herein incorporated by reference.

Fatty acid anhydrides, including captic and caprylic fatty acid anhydrides, have been prepared by several known procedures such as dehydration of fatty acids using ketone, acetic anhydride, P2O5, phosgene or other dehydrating agents; thermal dehydration of fatty acids or soaps; acylation of fatty acids with fatty acyl halides; use of coupling agents such as dicyclohexylcarboiimide; acylation of fatty acids with enol esters and other methods as shown in R. Grimm, Fatty Acids, The American Chemists Society, ed. by E.H. Pryde, p. 218, 1979.

A preferred way to prepare food-grade fatty acid anhydrides is by the reaction of the higher fatty acids with a dehydrating agent, such as acetic anhydride. The thermal dehydration of fatty acids to form their anhydrides has generally been accomplished via a single-step, high temperature (e.g. $>175°$ C.) disproportionation reaction. For example, acetic anhydride is reacted with fatty acids to yield a mixture of mixed and symmetrical fatty acid anhydrides, and, simultaneously, the mixed anhydrides are disproportionated to symmetrical anhydrides using stringent processing conditions (e.g., progressively lower vacuum and increasing temperature profile). The reaction is driven by the continual removal of acetic acid. See, for example, U.S. Pat. Nos. 2,981,744 issued to N. Ward et al on Apr. 25, 1961; 2,250,139 issued to C. Fuchs on Aug. 29, 1950; 2,246,599 issued to H. Oxely et al on Jun. 24, 1941; 2,026,985 issued to C Malm on Jan. 7, 1936; 2,221,026 issued to C. Malm et al on Nov. 12, 1940; 2,163,013 issued to H. Schultz on Jun. 20, 1939; and 2,411,567 issued to J. Fisher on Nov. 26, 1946.

The stringent processing conditions (e.g., high temperatures, low vacuum and long exposure times) typical of the disproportionation reaction were necessary to convert substantially all of the mixed anhydrides to symmetrical anhydrides. The presence of mixed $C_2/C_8$ or $C_2/C_{10}$ anhydrides results in the formation of acetin-containing triglycerides during the acylation of monobehenin. These types of fats exhibit an alpha phase, which is detrimental to formation of the desired beta phase in the reduced calorie cocoa butter substitute. (See Feuge et al, JAOCS, vol. 34 (1957), pages 239–244 and Feuge et al JAOCS, vol. 33 (1956), pages 367–371, both of which are herein incorporated by reference). Mixed anhydride levels below 0.5%, preferably below 0.2%, and most preferably below 0.1% are necessary for acceptable chocolate product performance.

Unfortunately, appreciable degradation occurs at these high temperatures (e.g. temperatures above 180° C.) and long exposure times practiced in the prior art. This results in the formation orby-products such as color and odor bodies as well as di-fatty ketones. Typical di-fatty ketone levels of fatty acid anhydrides prepared by this type of disproportion reaction are in excess of 3000 ppm. Once formed, these di-fatty ketones and other by-products are difficult to remove and often render the resultant fatty anhydrides unsuitable for use in preparing cocoa butter substitutes or other food products.

It has now been found that fatty acid anhydrides which contain minimal by-products and which are suitable for food applications can be prepared from fatty acids and acetic anhydride by a fast, three-stage, low temperature process whereby mixed anhydrides are removed from the reaction mixture in a separate process step via thin-film short path evaporation rather than disproportionated.

Fatty acid anhydrides prepared according to this process will have purity levels of at least about 95%, di-fatty ketone levels of less than 300 ppm, good odor and minimal color formation compared to the starting fatty acids.. High purity cocoa butter substitutes can be prepared using stoichiometric amounts of these symmetrical acid anhydrides and long chain monoglycerides without the use of solvent or catalysts.

SUMMARY OF THE INVENTION

The present invention relates to a non-catalytic process for the conversion of fatty acids into food-grade fatty acid anhydrides. The process comprises as a first step the liquid phase reaction of a higher fatty acid with a dehydrating agent for from about 5 to about 30 minutes at a temperature ranging from about 25° C. to about 150° C. Next, the fatty acids and mixed anhydrides are further converted to symmetrical anhydrides over a time period ranging from about 0.1 to about 60 minutes by the continual removal of the dehydration agent and by-product acid from the reaction mixture under a vacuum of from about 500 mm Hg to about 1 mm Hg and at a temperature of from about 100° to about 160° C. Finally, the symmetrical fatty acids are purified of the unsymmetrical anhydrides and unreacted fatty acids under a vacuum ranging from about 1 mmHg to about 0.001 mmHg at a temperature ranging from about 100° C. to about 220° C. The reaction mixture is maintained under these conditions for a time period ranging from about 0.1 to about 1 minute. The resulting fatty anhydrides are at least about 95% pure, and have di-fatty ketone levels of less than about 300 ppm and mixed fatty anhydride levels of less then about 0.5%.

DETAILED DESCRIPTION OF THE INVENTION

The present invention relates to a non-catalytic, fast, three stage, low temperature process for the conversion of fatty acids into food-grade anhydrides. The process may be a batch process or a continuous process, but is preferably a continuous process. The process of the present invention including unit operations, the materials used therein, and the fatty acid anhydrides prepared according to said process are described in detail as follows:

I. THE MATERIALS

The materials used in the process of the present invention include higher fatty acids and a dehydrating agent.

A. HIGHER FATTY ACIDS

Higher fatty acids are converted to fatty acid anhydrides by the process of this invention. The higher fatty acids may be medium chain or long chain, saturated or unsaturated. Specific examples of higher fatty acids which are suitable for use in the process of the present invention include butyric, hexanoic, octanoic, decanoic, lauric, myristic, palmitic, stearic, arachidic, behenic, myristoleic, palmitoleic, oleic, ricinoleic, linoleic, linolenic and erucic acids. Fatty acids per se or the natural distribution of fatty acids occurring fats and oils can serve as sources of fatty acids for use in the process of the present invention. Typically these fatty acids are obtained from edible oils including, for example, coconut oil, corn oil, olive oil, castor oil, palm oil, palm kernel oil, linseed oil, cottonseed oil, soybean oil, peanut oil, rapeseed oil, sunflower oil, safflower oil, sesame oil and marine oils. These fatty acids may also be synthetically prepared.

Medium chain (caprylic and caprio) saturated fatty acids are especially preferred for use in the process of the present invention because their corresponding acid anhydrides are particularly suitable for preparing cocoa butter substitutes. Medium chain $C_8/C_{10}$ saturated fatty acids can be obtained from coconut, palm kernel, or babassu oils. Typically, these sources of medium chain fatty acids are subjected to hydrolysis to provide a mixture of free fatty acids and glycerin, followed by fractional distillation to provide a fatty acid fraction enriched in medium chain fatty acids. They are processed to meet Food Chemical Codex criteria for caprylic and capric acids. Generally, medium chain saturated fatty acids which are suitable for use in the process of the present invention will be at least about 90% pure, preferably at least about 95% pure. It is also desirable that the sources of medium chain fatty acids have good thermal color stability, e.g., after heating at 205° C. for two hours, a mixture of caprylic and capric saturated fatty acids has only a 5-10% optical transmission reduction when measured at 440/550 nanometers.

B. A DEHYDRATING AGENT

The process of the present invention employs a dehydrating agent for the conversions of higher fatty acids into fatty acid anhydrides. Suitable dehydrating agents for use in this process include acetic anhydride and propionic anhydride. Acetic anhydride is an especially preferred dehydrating agent. Typically acetic anhydride for use in the process of the present invention will be at least about 99% pure.

II. PROCESS STEPS

The non-catalytic process of the present invention comprises three process steps: 1) liquid phase dehydration of the fatty acids, 2) further conversion of fatty acids and mixed anhydrides to symmetrical anhydrides, and 3) purification of the symmetrical fatty acid anhydrides.

A. LIQUID PHASE DEHYDRATION REACTION

The process comprises as a first step the liquid phase reaction of a higher fatty acid and a dehydration agent to yield an equilibrium reaction mixture of mixed and symmetrical anhydrides, along with unreacted fatty acids and residual amounts of the dehydration agent and the corresponding acid of the dehydrating agent.

The overall yield of symmetrical anhydrides is dependent on the mole ratio of dehydrating agent to higher fatty acid used in the reaction. The ratio can vary from less than a stoichiometric amount of dehydrating agent to an excess, but typically ranges from 0.5 to 3 moles of dehydrating agent to mole of fatty acid. It is preferable to use stoichiometric amounts of dehydrating agent in the liquid phase dehydration reaction from a cost standpoint.

The dehydration reaction is characterized by being conducted in the liquid phase at low temperatures and short residence times. Generally, however, the lower the temperature, the longer the residence time. The dehydration step of the process of the present invention reaction typically occurs at temperatures ranging from about 25° C. to about 150° C., preferably from about 75° C. to about 130° C., more preferably from about 90° to about 120° C. The reaction time for the dehydration reaction typically ranges from about 5 minutes to about 30 minutes, preferably from about 5 minutes to about 15 minutes, more preferably from about 5 minutes to about 10 minutes. Under these conditions about 15 to about 50% of the fatty acids are converted to an equilibrium mixture of mixed and symmetrical anhydrides. Optionally, the system can be operated under slight pressure to insure liquid phase reaction conditions.

A variety of reaction configurations can be used for the liquid phase dehydration reaction. For example, the reaction can be carried out in a batch reactor, backmix reactor, a static mixer, or a pressure loop. A tubular reactor is preferred. Typically the reactor is run under 2-3 bar pressure to insure that the reactants remain in liquid phase. The flow velocity through the system is generally in laminar flow, e.g., Reynolds number of 10-100, to prevent backmixing. See P. Trambouze et al, Chemical Reactors- Design/Engineering/Operation, 1988, Gulf Publishing Co., pp. 113-130. The reaction system construction materials should be selected to minimize metal corrosion from the acidic reactants.

B. FURTHER CONVERSION OF FATTY ACIDS AND MIXED ANHYDRIDES TO SYMMETRICAL ANHYDRIDES

A second process step involves the further conversion of fatty acids and mixed anhydrides to symmetrical anhydrides. This is accomplished by displacing the crude reaction mixture equilibrium by the continual removal of the dehydration agent and by-product acid from the reaction mixture under vacuum. About 80 to 90% of the fatty acids are converted to mixed and symmetrical anhydrides in this step.

A variety of means can be employed to accomplish the removal of the dehydration agent and the by-product acids from the reaction. Such means include high vacuum and low temperature flash evaporation, distillation or thin film evaporation. (See Ullman's Encyclopedia of Industrial Chemistry, Volume B-3, Chapter 3, 5th ed., 1988, Gerhartz et al, VCH, Weinheim, Germany, herein incorporated by reference). The dehydration agent is preferably removed by flash evaporation. When using the process of the present invention to prepare medium chain fatty anhydrides, it is preferable to perform the flash evaporation in two steps. Two isothermal flash steps operating at 300–500 mmHg and 3–5 mmHg are particularly effective for the removal of acetic acid, acetic anhydride, and unreacted caprylic and capric acids from the reaction mixture. These may then be recycled to the initial liquid phase dehydration reaction.

Regardless of the means employed to remove the dehydration agent and by-product acids, the removal is carried out at a vacuum typically ranging from about 500 mmHg to about 1 mmHg, preferably from about 300 mmHg to about 1 mmHg, more preferably from about 50 mmHg to about 1 mmHg. The temperature during this process step typically ranges from about 100 to about 160° C. Preferably the temperature ranges from about 120 to about 160° C., more preferably from about 140 to about 160° C. The dehydration reaction step is carried out over a period of time ranging from about 0.1 to about 60 minutes, preferably from about 0.1 to about 30 minutes, more preferably from about 0.1 to about 30 minutes. Typically the reaction mixture after this process step consists of from about 5% to about 15% mixed anhydrides and from about 85 to about 95% symmetrical anhydrides.

C. PURIFICATION OF SYMMETRICAL FATTY ACID ANHYDRIDES

A third process step involves purifying the symmetrical fatty acid anhydrides by removal of fatty acids and mixed anhydrides, along with residual dehydration agent and the corresponding acid thereof, from the reaction mixture. Purification of the symmetrical fatty acid anhydrides can be accomplished by a number of methods, including, for example, wiped film evaporation (see Handbook of Evaporation Technology, P. Minton, Noyes Publication, 1986, Park Ridge, New Jersey, herein incorporated by reference), centrifugal molecular still or thin-film short path evaporation (see Molecular Stills, P. Watt, pp. 180-214, pp. 215-284, 1963, Reinhold Publishing Corp., New York, herein incorporated by reference). A highly preferred means of removing fatty acids and mixed anhydrides is by thin-film short path evaporation.

Purification should be carried out as quickly as possible, using the lowest possible temperatures. Typically, the reaction mixture is heated to a temperature of from about 100° C. to about 220° C. under a vacuum ranging from about 1 mmHg to about 0.001 mmHg. The temperature preferably ranges from about 120° to about 220°, more preferably from about 150° to about 220° F. The vacuum preferably ranges from about 0.5 mmHg to about 0.001 ramrig, more preferably from about 0.1 to about 0.001 mmHg. The time period from removing the fatty acids and mixed anhydrides under these conditions ranges from about 0.1 to about 1 minute.

III. CHARACTERISTICS OF THE FATTY ACID ANHYDRIDES PREPARED ACORDING TO THE PROCESS OF THE PRESENT INVENTION

The fatty anhydrides prepared according to the process of the present invention are characterized by high purity, good color and odor, and minimal by-products. Therefore, the fatty acid anhydrides prepared according to the process of the present invention are useful in food applications, and, in particular, are useful for the preparation of reduced calorie cocoa butter substitutes.

Specifically, the fatty acid anhydrides prepared according to the process for the present invention have a purity level of at least about 95%, preferably at least about 98%, more preferably at least about 99%. Importantly, these fatty anhydrides further have a di-fatty ketone level of less than about 300 ppm, more preferably less than about 50 ppm, most preferably less than about 10 ppm. The level of mixed anhydrides is typically less than about 0.5%, preferably less than 0.2%, more preferably less than 0.1%. These fatty acid anhydrides are also characterized good color. The anhydride color measured at a % transmittance of 440 nm is typically greater than about 75, preferably greater than about 85. The anhydride color measured at a % transmittance of 550nm is typically greater than about 95, preferably greater than about 97.

ANALYTICAL TEST METHODS

A number of parameters used to characterize elements of the present invention are to be quantified by particular experimental analytical procedures. Each of these procedures is described in detail as follows:

1. Anhydride Color

The color of fatty anhydrides is measured spectrophotometrically at 440 and 550 nanometers. Typically the absorbance is measured on a neat anhydride sample versus a methylene chloride blank. Standard 1 centimeter cells are used for the analysis. The absorbance is reported as the % transmittance of the sample.

2. Determination of Anhydride Purity and Mixed Anhydrides

A. Reagents and Equipment

Gas chromatograph: HP 5890A.
Auto sampler: HP 7673A microdrop injector with tray thermostated to 25° C.
Integrator: HP 3396.
Column: J&W DB-1, 2 meters long, 0.25 mm inner diameter, 0.25 micron film thickness.
Injector: Split injection, HP flow inverted insert, 1 cm of firmly packed silanized glass wool.
Silyating Reagent: BSTFA (N,O)-Bis (Tdmethylsilyltdfluoraceamide).
Solvent: Chloroform (HPLC grade).
Internal Standard: Tricaprin (Sigma).
Calibration Standards: Sigma reagent grade fatty acids and anhydrides.

B. Instrument Conditions

Carrier Gas: hydrogen.

Septum Purge: 2–3 ml/min.
Hydrogen Gas Flow Rate: 1.5–2 ml/min.
Hydrogen Pressure: 40 psi.
Split Ratio: 85/1-100/1.
Detector Hydrogen: 30 ml/min.
Detector Air: 330 ml/min.
Detector Make-up: 25 ml/min.
Injector Temperature: 350° C.
Detector Temperature: 375° C.

C. Sample Preparation

Heat sample at 80° C. until completely melted. Pipette a 500 microliter portion of the melted sample into a 5 ml volumetric flask and dilute to volume using chloroform. Transfer 250 microliter portion of the solution to an auto sampler vial, add 1.0 ml of fresh BSTFA, cap vial, and heat to 100° C. for 5 minutes. Cool sampler vial before analysis.

D. Column Oven Temperature Conditions
Initial Temperature: 80° C. for 0.5 minutes.
Temperature Ramp: 20° C./minute.
Ending Temperature: 350° C. and hold for 10 minutes.

E. Calibration/Results

Analytical results are expressed as a weight % of total fatty acids, mixed anhydrides, and anhydrides in the sample. Reagent standards for C8:0, C10:0, C22:0 fatty acids and anhydrides are used for calibration and for determination of response factors. Typical fatty acid response factors are 1.05, while those for the respective fatty acid anhydrides are 0.8–0.85, relative to the tricaprin internal standard.

Mixed anhydrides containing acetyl groups are identified on the basis of retention times. GC/MS was used to confirm the structure of these compounds using the chromatographic conditions of this method. The mixed acetyl/caprylic and acetyl/capric anhydrides are expressed as a weight % using a response factor of 1.0.

3. Difatty Ketone Levels of Long-Chain Fatty Acid Anhydride Product

A. Preparation of Standard Solutions

Weigh approximately 50±0.05 mg of the ketone standard(s) of chain lengths inherent to the fatty acid anhydride samples being studied into separate 100mL volumetric flasks. Take the standards to volume with pure chloroform and mix well. From this each of the resulting top level solutions is accurately transferred 500 uL of solution into separate 5 mL volumetric flasks. Take these standards to volume with pure chloroform. Transfer a second 250 uL portion of each of the top level standard solutions to separate 5 ml volumetric flasks. These standards are then taken to volume with pure chloroform and mixed well. From the solutions resulting from the 250 uL transfers take 500 uL aliquots to separate 5 mL volumetric flasks. Take these standards also to volume with pure chloroform and mix well. Determine accurately the ug/mL concentrations of each solution. (These will equate to approximate concentrations of 500, 50, 25, and 2.5 ug/mL. Analogous to the approximate 0.5 gm of fatty anhydride samples to be prepared below, this equates to about 25,000, 2,500, 1,250 and 125 ppm of standards in a sample.) Transfer volumes of each standard respectively to gas chromatography (GC) sample vials having Teflon-lined caps.

B. Preparation of Samples

Weigh finely powered or liquid samples accurately (0.5±0.1 gm) into separate tared 5 mL reaction-vials with Teflon-lined screw-capped lids. Add 4 mL of pure hexane and 1 mL of pure diethylamine (DEA) and then cap and mix well. Let the samples react in a heating block for 10 minutes at 100° C. During the initial time of heating the mixtures are shaken until complete dissolution is assured. Following the ten minute reaction time remove the samples from the heating block and allow to just come to room temperature. Open each sample carefully and then transfer to separate 25 mL volumetric flasks using pure chloroform. An adequate volume of each sample is then transferred to separate GC sample vials for analysis.

C. Analysis of Calibration Samples and Unknowns

Prepared calibration samples and unknown samples are analyzed according to GC conditions described below. Calibration samples are run sequentially from lowest to highest concentrations for each standard first. Unknown samples may then be analyzed in any order.

Accurate area counts for the calibration samples are used to construct a calibration curve for quantitating the difatty ketones in the samples. The external standard approach is used. Absolute concentrations are plotted versus the area counts obtained for the different calibration levels. A linear solution is utilized for determining the concentrations of the difatty ketones in the samples.

In this analytical laboratory a chromatographic data system was used for performing the above data acquisition, analyses, and quantitation. The system used was PE Nelson's Turbochrom 3.3 utilizing a Gateway 2000 486 DX/33 computer.

D. Gas Chromatographic Instruments and Conditions

A HP 5890 Series II gas chromatograph (Hewlett Packard, Avondale, PA) was used to generate the data. The instrument was equipped with a HP7673A auto sampler attached to a cool on-column pressure programmed injector. The injector was set to inject 1 uL. Hydrogen was utilized as the carrier gas. The column used was a 15 meter, 0.25 mm i.d. and 0.25 um film thickness DB5 column (J&W Scientific, Folsom, CA). At the front of the analytical column was connected a 0.53 um i.d. 95% phenyl - 5% methyl deactivated guard column (Restek, Bellefonte, P A). The guard column was connected to the analytical column using a SGE glass-lined miniunion. The instrument was equipped with a flame ionization detector. The analog output from the GC system was connected to a PE Nelson 900 Series Interface which, in turn was connected to the chromatography data system.

Carrier Gas and Pressure Program: Hydrogen (11.2 psi for 2.5 min. then 1.19 psi/min. to 15.5 psi and hold).

Oven Program (with injector in oven tracking mode): 60° C. initial for 2.5 min. then 25° C./min. to 150° C. with no hold. Then 10°/min. to 350° C. and hold for 5 min.

Detector Conditions: Hydrogen=~30mL/min.; Nitrogen=30mL/min./; Air=~450mL/min.; Temperature=375° C.

4. Difatty Ketone Levels of Medium/Short-Chain Fatty Acid Anhydride Product

A. Preparation of standard solutions

Standard solutions having approximate concentrations of 500, 50, 25, and 2.5 ug/mL of the respective di-fatty ketones are prepared as described hereinabove in the method for determining Di-fatty ketone levels of Long-chain Fatty Acid Anhydride Product. Standard solutions having approximate concentrations of 1.25 and 0.0625 ug/mL are prepared by taking 2 more dilutions of 250 uL each into 5 mL volumetric flasks and taking to volume with chloroform.

B. Preparation of Samples

The samples are prepared according to the method described hereinabove for determining ketone levels of long chain fatty acid anhydride product.

C. Analysis of Calibration Samples and Unknowns

Prepared calibration samples and unknown samples are analyzed according to GC conditions described hereinabove in the method for determining di-fatty ketone levels of long chain fatty acid anhydride product.

D. Gas Chromatographic Instrument and Detector Conditions

A Siemens 2–8 gas chromatograph was used to perform the chromatography. The instrument was equipped with a septumless programmed temperature vaporization (PTV) valve. Sample volumes of 0.2 uL were injected. Hydrogen was utilized as the carrier gas. The column used was a 20 meter, 0.18 mm i.d. and 0.18 um film thickness DBMS column (J&W Scientific, Folsom, CA). The gas chromatograph was attached via a directly coupled transfer line to an ion trap detector (ITD, Finnigan MAT)) serving as a benchtop mass spectrometry detector. The output of the ITD was directed to Finnigan Mat's TrapMaster software for acquisition and processing of the mass spectral data. The ITD was configured in the chemical ionization mode to perform selected ion monitoring of the M++1 molecular ion for the respective di-fatty ketones (i.e., m/e 227, m/e 255 and 283, respectively, for C 15 DFK, C 17 DFK and C 19 DFK). In this way co-eluting/interfering compounds, as noted with the use of a flame ionization detector, were not detected.

Gas Chromatographic Conditions:

Carrier Gas and Pressure: Ultra high purity Hydrogen (2.6 bar).

Oven Program: 80° C. initial for 5 min. then 25° C./min. to 100° C. with no hold. Then 5°/min. to 325° C. and no hold.

PTV Injector Program (splitless): 65° C. for 2.1 min.: 800°/min. to 340° C. with 3 min. hold.

| ITD 800 Acquisition Parameters | |
|---|---|
| Electron Multiplier: | 1350 volts |
| Manifold: | 248° C. |
| Transfer-line and interfaces: | 325° C. |
| Selected Ions Monitored by CI (isobutane): | 227, 255 and 283 amu |
| Ion Time: | 2000 usecs |
| Reaction Time: | 100 msecs |
| Ionization Level: | 9 amu |
| Reaction Level: | 22 amu |
| Background Mass: | 210 |
| Low Scan Limit: | 45 amu |

EXAMPLES

Specific examples of the preparation of food-grade fatty acid anhydride according to the process of the present invention are as follows:

EXAMPLE 1

Several reagent grade and commercial capric and caprylic acids are converted to anhydrides by the three step process of this invention.

Equimolar acetic anhydride (Sigma A-6404) and medium chain ($C_8$ or $C_{10}$) fatty acids (various sources) are reacted in a 1000 ml 4 necked round bottom reaction flask. The reaction vessel has a magnetic stirrer, N2 bubbler to prevent bumping, Vigreux distillation column, and distillate condenser. Temperature control is provided by an electric heating mantel and thermowatch. The initial reaction weight ranges from 304 to 605 grams.

8 in Hg of vacuum is applied at 25° C. The acetic anhydride and fatty acid mixtures are heated over a 12 minute period to 130–140° C. No C15 (heptadecanone) or C19 (nonadecanone) all-fatty ketones (DFK) are observed in reaction samples following this dehydration reaction. The purity of each sample after this first process step (dehydration) is recorded in Table I set forth hereinafter.

Full vacuum is applied to the vessel to remove the acetic acid and unreacted acetic anhydride. Reaction temperature typically remains at 110° C. until the majority of the distillation is completed. The distillation proceeds until the pot temperature reaches 138° C. and is then terminated. The typical time period is about 10–15 minutes. Next the reaction mixture is cooled to 60° C., and the samples are analyzed for DFK formation according to the method for determining di-fatty ketone levels of medium short chain fatty acid product set forth hereinbefore in the Analytical Methods sections. No C 15 or C 19 di-fatty ketones are detected. The purity of each sample after this second process step (further conversion of fatty acids and mixed anhydrides to symmetrical anhydrides) is recorded in Table I.

The remaining mixed anhydrides and fatty acids are removed by short path evaporation. A 2 inch glass Pope still is used for the purification. It is operated at 120° C. jacket temperature, 20 micron pressure, 40° C. internal condenser temperature, 450 rpm reverse wiper speed, and 5 drop/second feedrate. A 15–20% distillate fraction is removed under these conditions. The purity of each sample after this 3rd process step (purification) is recorded in Table 1. The level of C 15 and C 19 di-fatty ketone (ppm), the % fatty acid conversion, and the level of mixed anhydrides (%) of each of the final products are also recorded in Table I. The color of fatty acid anhydrides prepared according to this Example 1 is good. A $C_8$ fatty anhydride prepared according to Example 1 had a color of 91.4 measured at a % transmittance of 440 nm and a color of 97.7 measured at a % transmittance of 550 nm.

TABLE 1

Evaluation of Low Temperature/Short Time Anhydride Process

| | | Purity (%) | | | | | |
|---|---|---|---|---|---|---|---|
| Sample | Fatty Acid | Step 1 (Dehydration) | Step 2 (Further Conversion) | Step 3 (Purification) | Fatty Acid Conversion | Mixed Anhydride (%) | C15–C19 DFK (ppm) |
| 1 | Henkel C8:0 | 14.8 | 84.7 | — | 81.6 | — | <25(1) |
| 2 | Sigma C10:0 | — | 92.7 | 99.2 (20% cut) | — | <0.1 | <15(1) |

TABLE 1-continued

Evaluation of Low Temperature/Short Time Anhydride Process

| Sample | Fatty Acid | Purity (%) Step 1 (Dehydration) | Step 2 (Further Conversion) | Step 3 (Purification) | Fatty Acid Conversion | Mixed Anhydride (%) | C15–C19 DFK (ppm) |
|---|---|---|---|---|---|---|---|
| 3 | Henkel C8:0 Re-Distilled | 17.2 | 91.9 | — | — | — | None |
| 4 | Henkel C10:0 | — | 95.2 | 99.0 (17% cut) | 86.2 | 0.09 | None |
| 5 | C8:0 (P&G C-895) | 17.1 | 89.7 | 98.2 (15% cut) | 78.7 | 0.55 | None |
| 6 | C10:0999 (P&G C-1095) | 19.2 | 94.7 | 99.1 | — | 0.05 | None |

EXAMPLE 2

Equimolar acetic anhydride (A-6404) and behenic acid (Unichema 2989) are reacted in the reaction apparatus described in Example 1 as follows. Behenic acid is heated to 115° C. with N2 sparge and agitation. The acetic anhydride is then added to the vessel. The total weight of the reaction mixture is about 650 grams.

The procedures outlined in Example 1 for the dehydration and conversion steps of the process of the present invention are followed. The reaction mixture is then purified by short path evaporation. About 455 grams of the reaction mixture is loaded into a 2 inch glass Pope short path evaporator. It is operated at 220° C., 30 micron pressure, 95° C. internal condenser temperature, 266 rpm reverse wiper speed, and 3 drops/second feedrate. A 12.3% distillate is removed from the anhydride reaction mixture.

The level of tritetracontan-21-one (C43 DFK) is 513 ppm as measured according to the method for determining difatty ketone levels of long chain fatty acid anhydride products set forth hereinbefore in the Analytical Methods section. The color of the product measured at % transmittances of 440 nm and 550 nm is 97.5 and 99.1, respectively.

EXAMPLE 3

The three step anhydride process of this invention is optimized for behenic fatty acid.

The behenic acid dehydration is carried out in a 5 liter, 4 necked round bottom reaction flask equipped with a magnetic stirrer, N2 bubbler to prevent bumping, Vigreux distillation column, and distillate condenser. Temperature control is provided by an electric heating mantel and thermowatch.

The behenic acid (Unichema 2989) is heated to 90° C. with N2 sparge and agitation. The purity of the behenic acid is 93.6%. An equimolar quantity of acetic anhydride (Sigma A-6404) was added to the melted behenic fatty acid. The total weight of the reaction mixture is about 3653 grams.

The acetic anhydride is reacted with the behenic fatty acid at atmospheric pressure and 75° C. for 22 minutes. 14 in Hg vacuum is applied over the next 30 minutes. Reactant temperature is maintained at 77°–90° C. Acetic acid distillation is then continued for another 60 minutes.

The reaction mixture is purified by short path evaporation. About 2655 grams of the reaction mixture are loaded into a 2 inch glass Pope short path evaporator. It is operated at 210°–220° C., 29 micron pressure, 90° C. internal condenser temperature, 250 rpm reverse wiper speed, and 3 drops/second feedrate. A 10% distillate cut is made at 210° C. In part of the run a 220° C. jacket temperature is used. This resulted in a 16% distillate cut. The two residue fractions are combined. The product purity is approximately 99% behenic anhydride, 0.5% mixed anhydride, and 0.5% behenic acid. The level of di-fatty ketones is 471 ppm when a short path temperature of 220° C. is used and 263 ppm when a short path temperature of 210° C. is used. Further reductions in the level of di-fatty ketone present in the product are possible using lower dehydration and short path evaporation temperatures.

EXAMPLE 4

Equimolar acetic anhydride (A-6404) and oleic acid (Pfaltz & Bauer Technical Garde) are reacted in the reaction apparatus described in Example 1. Oleic acid is heated to 115° C. with N2 sparge and agitation. The acetic anhydride is then added to the vessel. The total weight of the reaction mixture is about 306 grams.

The procedure outlined in Example 1 for the dehydration and conversion steps is followed. The reaction mixture is then purified by short path evaporation. About 214 grams of the reaction mixture are loaded into a 2 inch glass Pope short path evaporator which is operated at 170°–180° C., 10–20 micron pressure, 30° C. internal condenser temperature, 244 rpm reverse wiper speed, and 3 drops/second feedrate. A 9% distillate is removed from the anhydride reaction mixture.

The level of 9,26-pentacosandien-17-one (C35:2 DFK) in the product is 41 ppm as measured according to the method for determining difatty ketone levels of long chain fatty acid anhydride products set forth hereinbefore in the Analytical Methods section.. The color of the reaction product is measured at % transmittances of 440 nm and 550 nm is 75.4 and 95.5, respectively.

What is claimed is:

1. A process for preparing food grade fatty acid anhydrides from fatty acids, said fatty acid anhydrides having a purity of at least about 95%, a level of di-fatty ketones less than about 300 ppm and a level of mixed anhydrides less than about 0.5%, said process comprising the steps of:

A. reacting in a liquid phase a higher fatty acid with a dehydration agent for from about 5 to about 30 minutes at a temperature of from about 25° to about 150° C. to yield an equilibrium mixture, wherein the dehydration agent is selected from the group consisting of acetic anhydride and propionic anhydride, B. further converting the fatty acids and mixed anhydrides to symmetrical anhydrides over a time period ranging from about 0.1 to about 60 minutes by continuous removal of the dehydrating agent via high vacuum and low temperature flash evaporation, distillation or thin film evaporation, while maintaining the reaction vessel at a vacuum of from about 500 to about 1 mm Hg and a temperature ranging from about 100° to about 160° C., and C. purifying the symmetrical anhydrides via wiped film evaporation, centrifugal molecular still or thin-film short path evaporation under a vacuum of from abut 1 to about 0.001 mm Hg at a temperature ranging from about 100° to about 220° C. and maintaining the reaction mixture under these conditions for a time period ranging from 0.0 to 1 minute.

2. A process for preparing food-grade fatty acid anhydrides according to claim 1 wherein the dehydration agent is acetic anhydride.

3. A process for preparing food-grade fatty acid anhydrides according to claim 2 wherein the process is a continuous process.

4. A process for preparing food-grade fatty acid anhydrides according to claim 3 wherein the higher fatty acids reacted with the dehydration agent in Step (A) comprise $C_8$ saturated fatty acids, $C_{10}$ saturated fatty acids, or a mixture thereof.

5. A process for preparing food-grade fatty acid anhydrides according to claim 4 wherein the removal of the dehydration agent in step (B) is accomplished via flash evaporation at a vacuum ranging from about 300 to about 1 mmHg and temperature ranging from about 120° to about 160° C. over a time period ranging from about 0.1 to about 30 minutes.

6. A process for preparing food-grade fatty acid anhydrides according to claim 5 wherein the removal of fatty acids and mixed anhydrides from the reaction mixture in step (C) is accomplished via thin-film short path evaporation.

7. A process for preparing food-grade fatty acid anhydrides according to claim 6 wherein the removal of fatty acids and mixed anhydfides from the reaction mixture in step (C) takes place at a vacuum of from about 0.5 to about 0.001 mmHg and a temperature ranging from about 120° to about 220° C.

8. A process for preparing food-grade fatty acid anhydrides according to claim 7 wherein the fatty acid anhydrides have a purity of at least about 98%, a color of greater than 75 at a transmittance of 440 nm and greater than 95 at 550 nm, and wherein the level of di-fatty ketones is less than about 50 ppm and the level of mixed anhydrides is less than about 0.2%.

9. A product prepared according to the process of claim 1.

10. A product prepared according to the process of claim 8.

11. A process for preparing food-grade fatty acid anhydrides according to claim 3 wherein the higher fatty acids reacted in step (A) comprise $C_{22}$ saturated fatty acids.

12. A process for preparing food-grade fatty acid anhydrides according to claim 11 wherein the removal of the dehydration agent in step (B) is accomplished via flash evaporation at a vacuum ranging from about 300 to about 1 mmHg and temperature ranging from about 120° to about 160° C. over a time period ranging from about 0.1 to about 30 minutes.

13. A process for preparing food-grade fatty acid anhydrides according to claim 12 wherein the removal of fatty acids and mixed anhydrides from the reaction mixture in step (C) is accomplished via thin-film short path evaporation.

14. A process for preparing food-grade fatty acid anhydrides according to claim 13 wherein the removal of fatty acids and mixed anhydfides from the reaction mixture in step (C) takes place at a vacuum of from about 0.5 to about 0.001 mmHg and a temperature ranging from about 120° to about 220° C.

15. A process for preparing food-grade fatty acid anhydrides according to claim 14 wherein the fatty acid anhydrides have a purity of at least about 98%, a color of greater than 75 at a transmittance of 440 nm and greater than 95 at 550 nm, and wherein the level of di-fatty ketones is less than about 50 ppm and the level of mixed anhydrides is less than about 0.2%.

16. A process for preparing food-grade fatty acid anhydrides according to claim 3 wherein the higher fatty acids reacted in step (A) comprise oleic fatty acids.

17. A process for preparing food-grade fatty acid anhydrides according to claim 16 wherein the removal of the dehydration agent in step (B) is accomplished via flash evaporation at a vacuum ranging from about 300 to about 1 mmHg and temperature ranging from about 120° to about 160° C. over a time period ranging from about 0.1 to about 30 minutes.

18. A process for preparing food-grade fatty acid anhydrides according to claim 17 wherein the removal of fatty acids and mixed anhydrides from the reaction mixture in step (C) is accomplished via thin-film short path evaporation.

19. A process for preparing food-grade fatty acid anhydrides according to claim 18 wherein the removal of fatty acids and mixed anhydrides from the reaction mixture in step (C) takes place at a vacuum of from about 0.5 to about 0.001 mmHg and a temperature ranging from about 120° to about 220° C.

20. A process for preparing food-grade fatty acid anhydrides according to claim 19 wherein the fatty acid anhydrides have a purity of at least about 98%, a color of greater than 75 at a transmittance of 440 nm and greater than 95 at 550 nm, and wherein the level of di-fatty ketones is less than about 50 ppm and the level of mixed anhydrides is less than about 0.2%.

* * * * *